US011652386B2

(12) United States Patent
Endler et al.

(10) Patent No.: US 11,652,386 B2
(45) Date of Patent: May 16, 2023

(54) DEVICE AND METHOD FOR THE DETECTION OF WEAR ON A SLIDING CONTACT AND BRUSHGEAR SYSTEM

(71) Applicant: Conductix-Wampfler GmbH, Weil am Rhein (DE)

(72) Inventors: Niklas Endler, Schwörstadt (DE); Moritz Hagin, Weil am Rhein (DE); Nicholas Winter, Lörrach (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 849 days.

(21) Appl. No.: 16/496,562

(22) PCT Filed: May 16, 2018

(86) PCT No.: PCT/EP2018/062687
§ 371 (c)(1),
(2) Date: Sep. 23, 2019

(87) PCT Pub. No.: WO2019/011508
PCT Pub. Date: Jan. 17, 2019

(65) Prior Publication Data
US 2020/0036258 A1    Jan. 30, 2020

(30) Foreign Application Priority Data

Jul. 13, 2017    (DE) ................... 10 2017 115 744.1

(51) Int. Cl.
*H02K 11/21*    (2016.01)
*H02K 5/167*    (2006.01)
(Continued)

(52) U.S. Cl.
CPC ............... *H02K 5/167* (2013.01); *G06K 7/00* (2013.01); *H02K 5/148* (2013.01); *H02K 11/21* (2016.01); *G06K 7/0004* (2013.01); *G06K 7/0008* (2013.01)

(58) Field of Classification Search
CPC ... B60L 5/085; B60M 1/302; C10M 2201/05; C10M 2201/062; C10M 2201/08;
(Continued)

(56) References Cited

U.S. PATENT DOCUMENTS 7,923,892 B2    4/2011    Mark et al.
8,084,704 B2    12/2011    Mark
(Continued)

FOREIGN PATENT DOCUMENTS

CN    1313209 A    9/2001
CN    1898103 A    1/2007
(Continued)

OTHER PUBLICATIONS

International Preliminary Report on Patentability dated Jan. 14, 2020 with Written Opinion for PCT/EP2018/062687 filed May 16, 2018 (English translation).
(Continued)

*Primary Examiner* — Naishadh N Desai
(74) *Attorney, Agent, or Firm* — Paul D. Bianco; Fleit Intellectual Property Law

(57) ABSTRACT

A device and method for detection of wear of a sliding contact which may be displaced along a brushgear, includes a sensor and a measurement indicator designed for detection by the sensor. The sensor and the measurement indicator approach or move away from each other by a shortening of the sliding contact caused by wear, and a brushgear system. The problem of enabling simple, reliable detection of the practically complete wear of the sliding contact is addressed
(Continued)

by the sensor being designed for contactless and/or contacting detection of the measurement indicator, and by means of a brushgear system having a device of this kind, and also a method of this kind in which the sensor detects the measurement indicator becoming closer to the sensor contactlessly and/or contactingly and, when a threshold value for a predetermined wear of the sliding contact is exceeded, issues a warning signal.

20 Claims, 6 Drawing Sheets

(51) Int. Cl.
*H02K 5/14* (2006.01)
*G06K 7/00* (2006.01)

(58) Field of Classification Search
CPC ...... C10M 2201/081; C10M 2201/082; C10M 2201/084; C10M 2201/102; C10M 2207/125; C10M 2207/129; C10M 2207/281; C10M 2207/282; C10M 2207/283; C10M 2207/286; C10M 2207/289; C10M 2215/06; C10M 5/00; C10N 2010/00; C10N 2010/02; C10N 2010/04; C10N 2010/06; C10N 2010/08; C10N 2050/10; H02K 11/21; H02K 5/148; H02K 5/167; G06K 7/00; G06K 7/0004; G06K 7/0008
See application file for complete search history.

(56) References Cited

U.S. PATENT DOCUMENTS

| 8,120,503 | B2 | 2/2012 | Mark et al. | |
| 9,152,902 | B2* | 10/2015 | Timm | G06K 19/07728 |
| 9,716,376 | B2 | 7/2017 | Maier et al. | |
| 2007/0000744 | A1 | 1/2007 | Craig | |
| 2016/0180518 | A1 | 6/2016 | Siemens | |

FOREIGN PATENT DOCUMENTS

| CN | 101052978 | A | | 10/2007 | |
| CN | 101566673 | A | * | 10/2009 | ........... G01R 31/343 |
| CN | 101566673 | A | | 10/2009 | |
| CN | 103687747 | A | | 3/2014 | |
| DE | 3215251 | A1 | | 11/1983 | |
| DE | 102005061412 | A1 | * | 6/2007 | ........... H01R 39/58 |
| DE | 102013214022 | A1 | | 1/2015 | |
| DE | 102014226694 | A1 | | 12/2015 | |
| EP | 2112518 | A1 | | 10/2009 | |
| JP | S6034701 | U | | 3/1985 | |
| JP | H03261303 | A | | 11/1991 | |
| JP | 2010-143450 | A | | 7/2010 | |
| JP | 2010143450 | A | * | 7/2010 | |
| JP | 2010143450 | A | | 7/2010 | |
| TW | 201 223 797 | A | | 6/2012 | |
| TW | 2012223797 | A | | 6/2012 | |
| WO | 2012/143506 | A2 | | 10/2012 | |

OTHER PUBLICATIONS

First Office Action dated Nov. 1, 2021 for Chinese Application No. 201880004091.2 with English translation (5 pages).
International Search Report dated Aug. 9, 2018 for PCT/EP2018/062687 filed May 16, 2018.
Written Opinion for PCT/EP2018/062687 filed May 16, 2018.
Result of examination report for German Application No. 10 2017 115 744.1 filed Jul. 13, 2017.
Office Action dated Aug. 31, 2022 for Chinese Application No. 201880004091.2 (8 pages).
Office Action dated May 13, 2022 for Chinese Application No. 201880004091.2 (23 pages, translation of 5 pages provided).

* cited by examiner

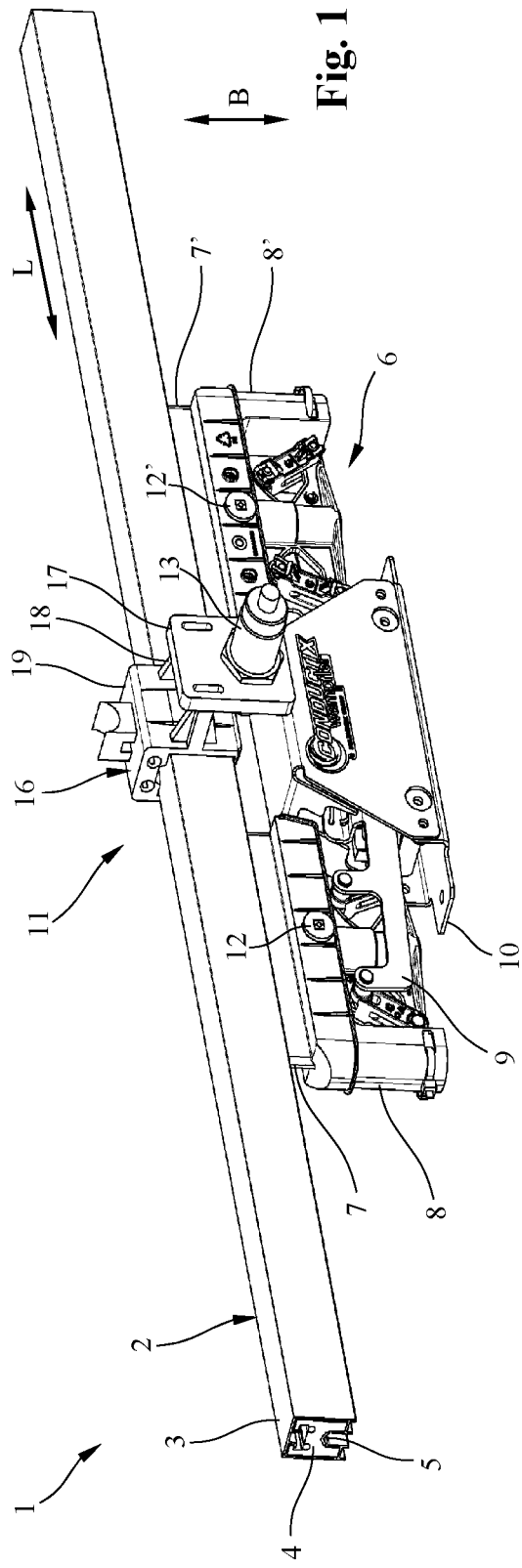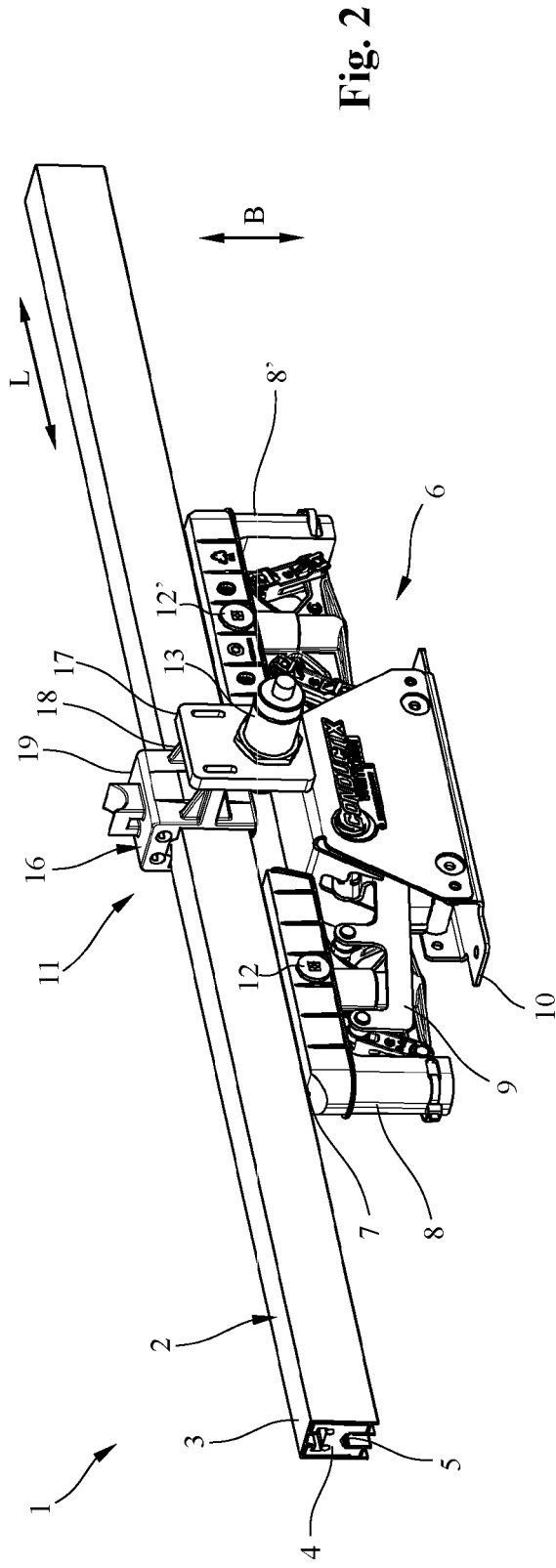

DEVICE AND METHOD FOR THE DETECTION OF WEAR ON A SLIDING CONTACT AND BRUSHGEAR SYSTEM

FIELD OF THE INVENTION

The present invention relates to a device for the detection of wear on a sliding contact that can be moved alongside a brushgear, a brushgear system, and a method for the detection of wear on a sliding contact that can be moved alongside a brushgear.

BACKGROUND OF THE INVENTION

In conventional brushgear systems, a current collector of a movable electrical load is routed alongside a stationarily installed brushgear. In a sliding contact support, the current collector supports a sliding contact, preferably a carbon brush, which contacts an electrically conductive sliding surface on the brushgear. The movement of the sliding contact on the brushgear and the transmission of electrical power via this contact-based connection causes the sliding contact to be worn down over time. To ensure that the sliding contact is nonetheless securely retained on the brushgear, the sliding contact is continuously pushed in the direction of the brushgear by means of a commonly spring-activated feed mechanism, which however increases the wear on the sliding contact. Thus, the sliding contact support with the sliding contact, the length of which is increasingly shortened, gradually moves in the direction of the brushgear.

To be able to ensure reliable and uninterrupted power transmission to the electrical load, it is desirable to monitor the wear on the sliding contact and to promptly inform the operator of the brushgear system that the sliding contact will soon be completely worn down. This allows the operator of the brushgear system to order new sliding contacts in good time and to replace the worn-down brushgear contacts.

DE 3215 251 C2 discloses an example of such a system in the form of a pulse-triggering means that responds to the progressing wear of the carbon brush of current collectors that form part of a brushgear. The pulse-triggering means is formed by a shaft extending on the back of the brushgear at right angles to the brushgear, a limit stop laterally projecting from the current collector, a pin disposed on the shaft and that projects laterally past the brushgear in the direction of the current collector side up to a level on which the limit stop associated with the current collector is disposed when the carbon brush is worn out, and an actuating member that actuates a switch when the shaft is rotated against the force of a return spring.

This solution has the disadvantage that mechanical contact between the pulse-triggering means and the current collector must be established. This type of actuation of the pulse-triggering means can, however, also be triggered by careless operating personnel, animals, or objects. In addition, especially when used in areas at risk of corrosion, for example, in large port facilities with salty ocean air, the problem is that, over time, the moving components of the pulse-triggering means corrode and are no longer able to correctly trigger the pulse-triggering means. In the worst-case scenario, the switch of the pulse-triggering means can no longer be moved at all so that the current collector is blocked or lifted out of the brushgear.

SUMMARY OF THE INVENTION

Thus, an aspect of the present invention relates to a device and a method for the detection of wear on a sliding contact that can be moved alongside a brushgear as well as a brushgear system, which device and method overcome the above-mentioned disadvantages and allow a simple, reliable, and early detection of a practically completely worn-down sliding contact.

A device for the detection of wear on a sliding contact that can be moved alongside a brushgear is disclosed, a brushgear system is also disclosed, and a method for the detection of wear on a sliding contact that can be moved alongside a brushgear, is also disclosed. Further advanced modifications and embodiments of the invention are also disclosed.

According to the present invention, an above-mentioned device for the detection of wear on a sliding contact that can be moved alongside a brushgear is characterized in that the sensor is designed for contactless and/or contacting detection of the measurement indicator.

The device can favorably comprise a mounting device for mounting the sensor on the brushgear, thereby allowing easy retrofitting of a brushgear system. The mounting device preferably comprises a mounting element that can be positioned on top of the brushgear and that can favorably have an inside contour that conforms to the outside contour of the brushgear. This allows the mounting device to be easily mounted on the brushgear. The mounting element preferably has an essentially U-shaped cross-section with two mounting legs that, in the mounted position, straddle the brushgear. On their free ends, the mounting legs can favorably have a first detent means for connection to a complementarily shaped second detent means of the brushgear, thereby ensuring that the sensor is securely mounted on the brushgear.

In a favorable embodiment, the sensor can be disposed on a current collector that supports the sliding contact. More specifically, a separate sensor can each be dedicated to a plurality of sliding contacts that differ from each other and that are disposed on the current collector. Preferably, a measurement indicator is dedicated to each sliding contact.

Furthermore, the sensor can favorably detect the approaching or distancing movement of the measurement indicator in a wear-induced direction of movement of the sliding contact extending especially at right angles to a longitudinal direction of the brushgear, which direction of movement preferably extends toward the brushgear.

In a favorable embodiment of the invention, the sensor can comprise a writing and/or reading module, especially an RFID writing and/or reading module, and the measurement indicator can comprise a contactlessly readable and/or writable data storage device, especially an RFID transponder. This makes it possible not only to easily detect the approaching movement of the measurement indicator toward the sensor but also to store and, in case of wear, to read additional information on the measurement indicator, e.g., information as to which type of sliding contact and/or which sliding contact support is involved. Furthermore, in this manner, a unique identification can be dedicated to each measurement indicator, based on which identification the measurement indicator can be unequivocally detected.

According to the present invention, an above-mentioned brushgear system is characterized in that the sensor is designed for contactless and/or contacting detection of the measurement indicator. The sensor on the brushgear and/or on the measurement indicator can be favorably disposed on a component of the current collector, which component, together with the sliding contact, can be moved in the direction of the brushgear. However, a reverse configuration can be favorable as well. Furthermore, the sensor is preferably disposed on the current collector so that the wear on the sliding contact can be monitored at all times, irrespective of at which point of the brushgear the current collector happens to be located. Preferably, a separate measurement indicator and/or a separate sensor is each dedicated to a plurality of sliding contacts.

During operation, the sliding contact is preferably permanently held or, more specifically, pushed in the direction of the brushgear by means of a feed mechanism, especially by means of a spring. In addition, the measurement indicator and the sensor can be disposed relative to each other in such a way that the measurement indicator, as a result of a wear-induced approaching movement of the sliding contact toward the brushgear, enters the measuring range of the sensor only once a predetermined level of wear on the sliding contact has been exceeded.

According to the present invention, an above-mentioned method for the detection of wear on a sliding contact of a brushgear is characterized in that the sensor contactlessly and/or contactingly detects an approaching movement of the measurement indicator toward the sensor and emits a warning signal when a threshold value for a predetermined level of wear on the sliding contact is exceeded. In this manner, the level of wear can be reliably determined, without requiring the sensor to be triggered by a contact means. Furthermore, this also provides for easy retrofitting of existing brushgears. The threshold value for the predetermined level of wear is preferably exceeded when the measurement indicator completely or partially enters a measuring range of the sensor or completely or partially moves out of the measuring range. The measurement indicator, together with the sliding contact, can favorably be moved in the direction of the brushgear.

The present invention will subsequently be described based on detailed practical examples with reference to the accompanying drawings. The drawings show:

BRIEF DESCRIPTION OF THE DRAWINGS

FIG. 1 a schematic three-dimensional view of a portion of a brushgear system according to the invention with an unworn sliding contact;

FIG. 2 the view of FIG. 1 with a largely worn-down sliding contact;

DETAILED DESCRIPTION OF THE INVENTION

Figure 3:
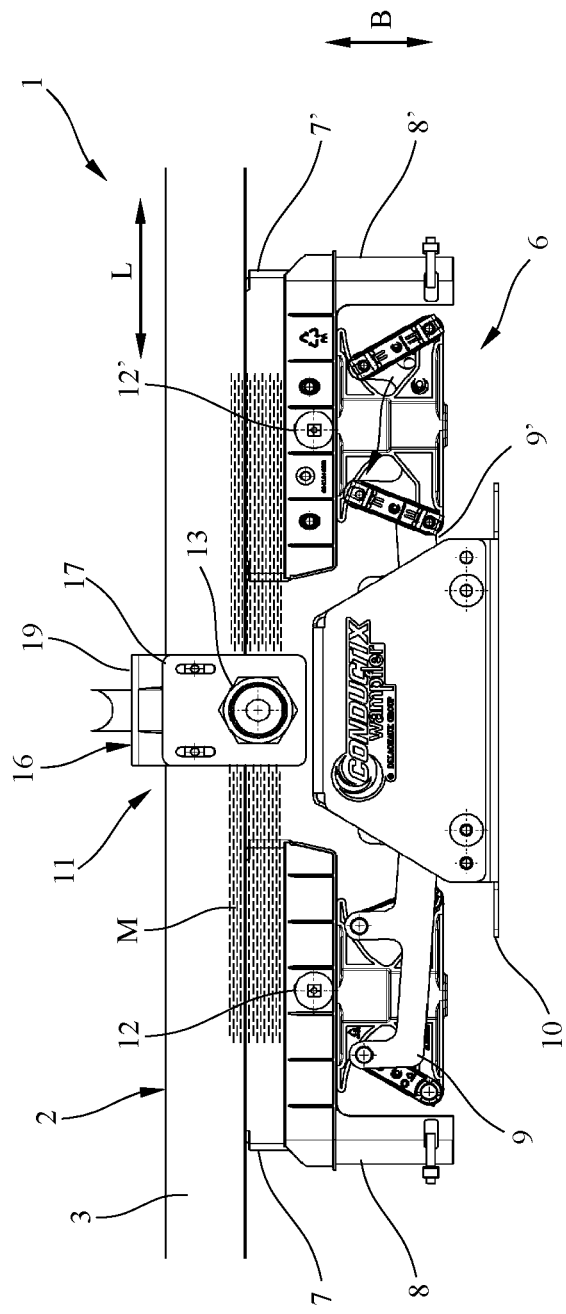
FIG. 3 a lateral plan view of the brushgear system shown in FIG. 1 with an unworn sliding contact.

FIG. 1 shows a schematic three-dimensional view of a portion of a brushgear system 1 according to the invention, comprising a brushgear 2 that extends in a longitudinal direction L.

The brushgear 2 has an elongated insulating profile 3 that surrounds an elongated, electrically conductive phase conductor profile 4 with an embedded electrically conductive sliding surface 5, preferably made of aluminum or steel.

Alongside the brushgear 2, a current collector 6 of an electrical load (not shown in the drawings) can be moved. The current collector 6 serves to supply the electrical load that moves alongside the brushgear as well as the electrical equipment installed thereon, for example, an electrical overhead conveyor or a container crane with different electrical propulsion and linear actuators.

The current collector 6 comprises a sliding contact 7 in the form of a carbon brush that during operation slides along the sliding surface 5. The sliding contact 7 is disposed on a sliding contact support 8 that can be moved in a manner known in the art toward and away from the sliding surface 5 by means of a prior-art feed mechanism 9 as shown in FIG. 1. The sliding contact 7 is connected by means of an electrical supply line, which is mounted on the sliding contact support 8 (not shown in the drawings), to the electrical load and the electrical equipment installed thereon so as to be able to supply it with electrical current and voltage. A second sliding contact 7' on the right side as shown in FIGS. 1 to 4 is disposed in mirror image relation to the sliding contact 7 on the current collector 6 via a complementarily configured second sliding contact support 8' and a second feed mechanism 9'. The description of the sliding contact 7, the sliding contact support 8 and the feed mechanism 9 as well as the associated components on the left side as shown in FIGS. 1 to 4 apply mutatis mutandis to the respective components on the right side, but laterally reversed as appropriate. Therefore, to the extent possible, the invention will be explained with reference to the left side of the current collector 6 as shown in FIGS. 1 to 4, with the respective components on the right side being marked with an apostrophe.

During operation, the sliding contact 7 is continuously pushed against the sliding surface 5 by means of the feed mechanism 9, for example, by spring force. The feed mechanism 9 is mounted in a bracket 10 of the current collector 6. The bracket 10 can be disposed on the electrical load in a manner known in the prior art.

The principles of the above-described embodiment are apparent to those skilled in the art and do not require further explanation.

As clearly shown in FIGS. 1 and 2, FIGS. 3 and 4 and FIGS. 5 and 6, each being respectively juxtaposed one to the other, the sliding contact 7 is worn down over time, among other things by sliding along the sliding surface 5. Because the sliding contact support 8, together with the sliding contact 7, is moved in the direction of the brushgear 2 by means of the feed mechanism 9, the sliding contact support 8 slowly but steadily moves from the positions distant from the brushgear shown in FIGS. 1, 3 and 5 toward the positions shown in FIGS. 2, 4 and 6 on the brushgear 2.

The invention takes advantage of this feature in order to be able to detect the level of wear on the sliding contact 7 in time before the sliding contact is completely worn down.

To be able to detect the successive approach of the sliding contact 7 toward the brushgear 2, a device in the form of a detection device 11 for the detection of wear on a sliding contact of a brushgear is provided. The detection device 11 comprises a measurement indicator 12 that is disposed on the sliding contact support 8. The measurement indicator 12, together with the sliding contact support 8, moves in the direction of movement B and, as a result of the wear on the sliding contact 7, thereby gradually moves closer to the brushgear 2. The measurement indicator 12 can be mounted on other areas or parts of the current collector 6 that move with the worn-down sliding contact 7 in the direction of the brushgear 2, for example, on the sliding contact 7 itself or on the feed mechanism 9.

To be able to detect the measurement indicator 12, a sensor 13 with integrated sensor electronics 14 and a transmitter unit 15 with a mounting device 16 are stationarily mounted on the brushgear 2. The sensor 13 is screwed to a retaining plate 17 that is held a distance away from the side of the brushgear 2 by means of a cantilever arm 18.

The cantilever arm 18 is disposed on a mounting element 19 that has an inside contour conforming to the outside contour of the brushgear 2 or, more specifically, of the insulating profile 3. In the case at hand, the mounting element 19 has a profile with an essentially U-shaped cross-section with mounting legs 20, 20'. On their free ends, the mounting legs 20, 20' comprise each a first detent means 21, 21' that engage in the complementary detent grooves 22, 22' of the insulating profile 3. This ensures that the mounting element 19 is securely seated on the brushgear 2, on the one hand, and at the same time makes it possible to easily mount and dismount the mounting element 19 on the brushgear 2, on the other hand. The detent grooves 22, 22' can optionally also be disposed on the mounting legs 20, 20', and the detent means 21, 21' can optionally be disposed on the insulating profile 3.

Similarly, instead of the mounting means described above and illustrated in the drawings, other mounting means are conceivable for mounting the sensor 13 on the brushgear 2.

In addition, the sensor 13 is connected in a manner known in the prior art via the transmitter unit 15 to a control unit of the brushgear system 1 to which the signals of the sensor 13 are transmitted. This allows a preliminary analysis of the sensor signals to be performed in the sensor electronics 14.

Figure 4:
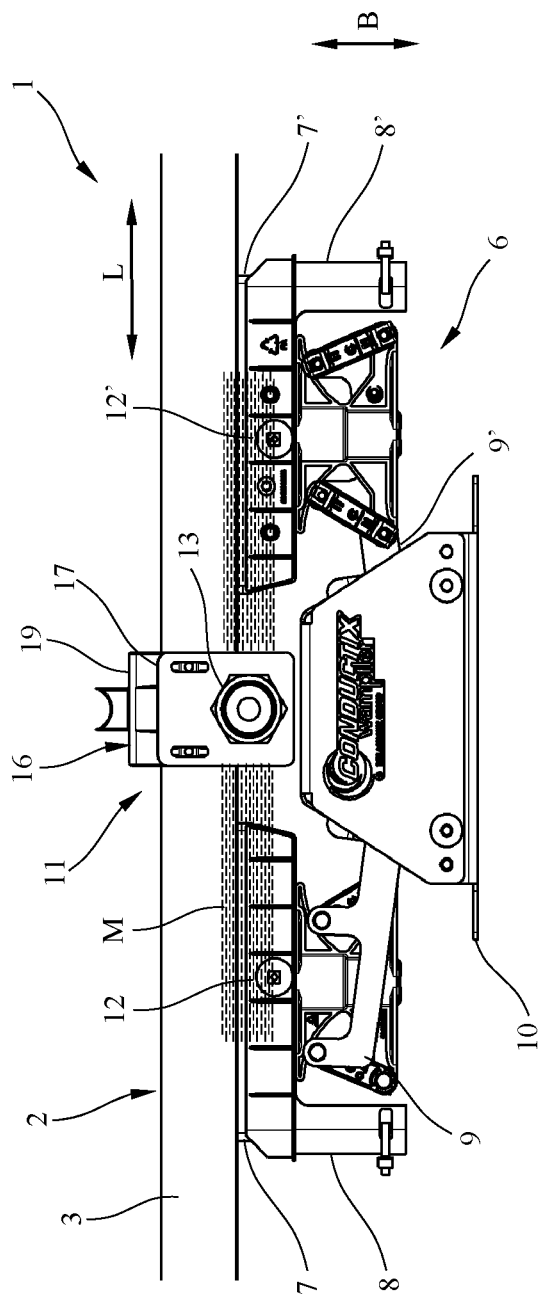
FIG. 4 a lateral plan view of the brushgear system shown in FIG. 2 with a largely worn-down sliding contact.
Figure 6:
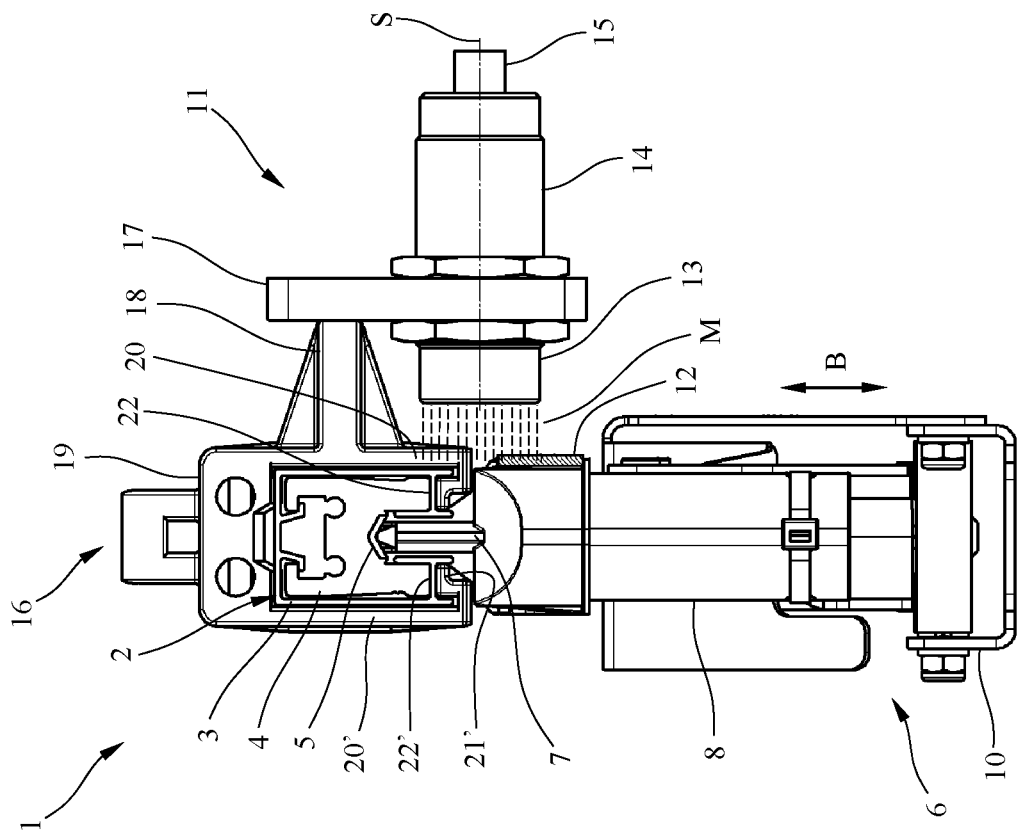
FIG. 6 a frontal plan view of the brushgear system shown in FIG. 2 with a largely worn-down sliding contact.
Figure 5:
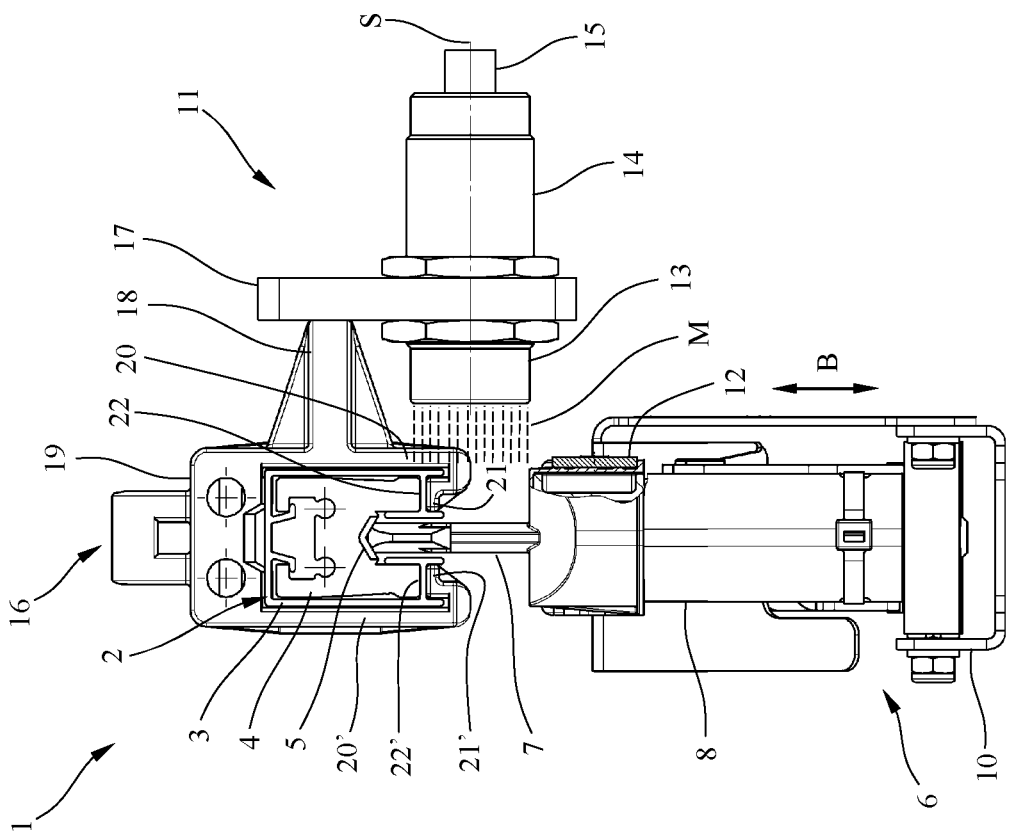
FIG. 5 a frontal plan view of the brushgear system shown in FIG. 1 with an unworn sliding contact.
Figure 8:
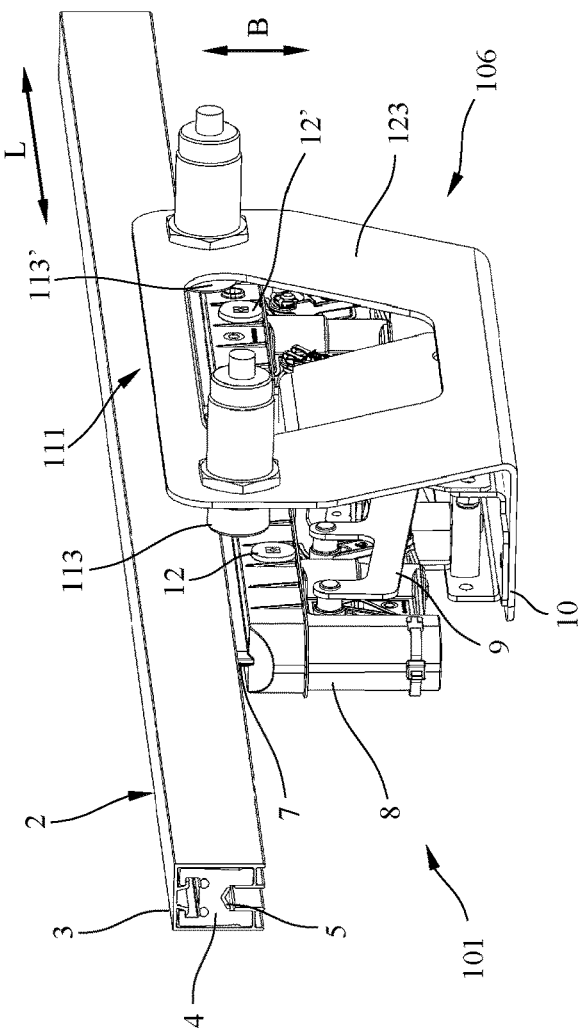
FIG. 8 the view of FIG. 7 with a largely worn-down sliding contact.
Figure 7:
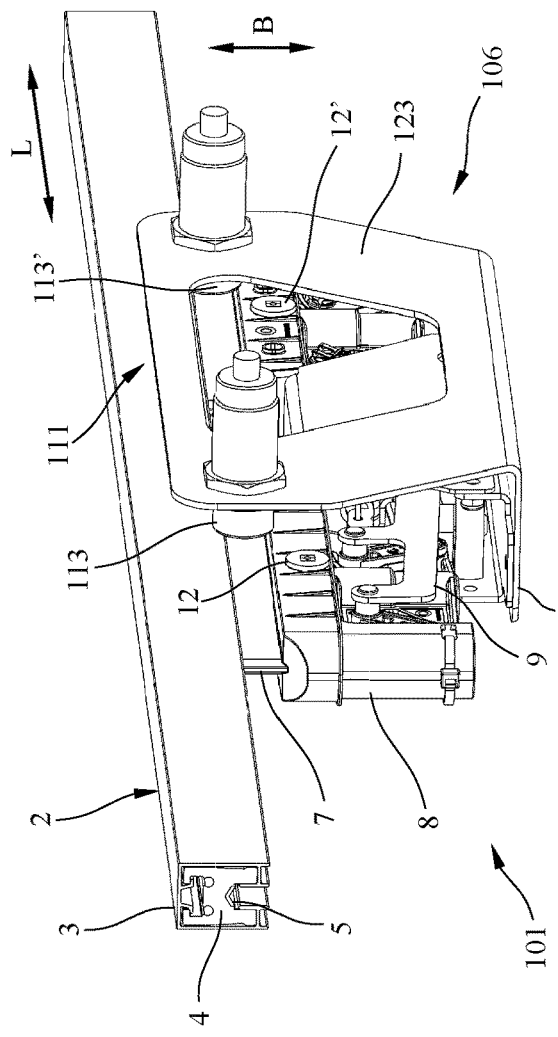
FIG. 7 a schematic three-dimensional view of a portion of an alternative brushgear system according to the present invention with an unworn sliding contact.
Figure 9:
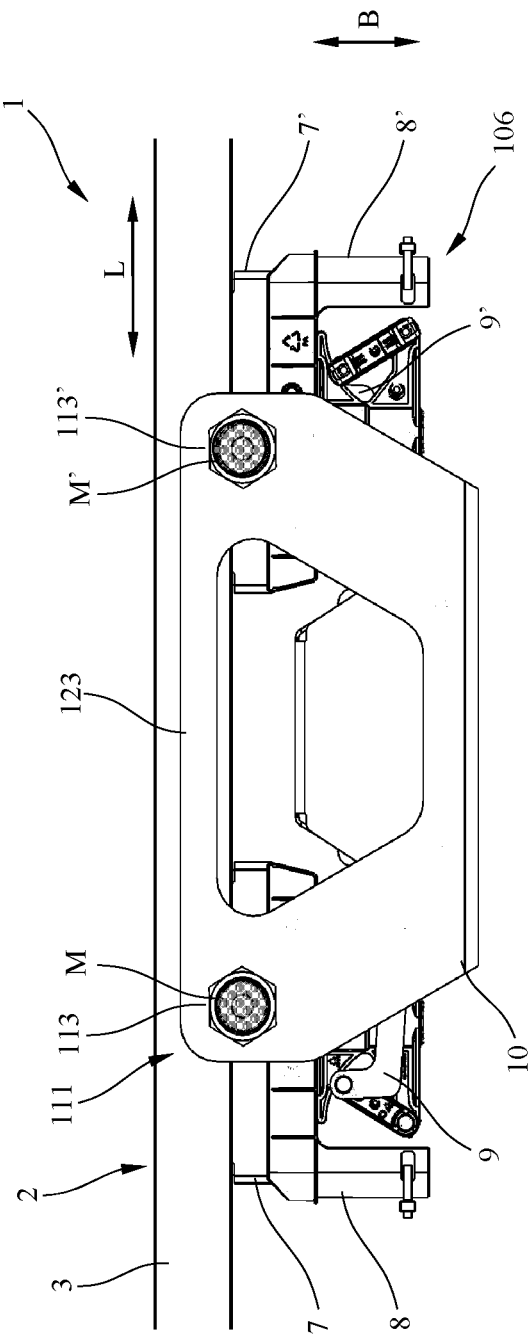
FIG. 9 a lateral plan view of the brushgear system shown in FIG. 7 with an unworn sliding contact.
Figure 10:
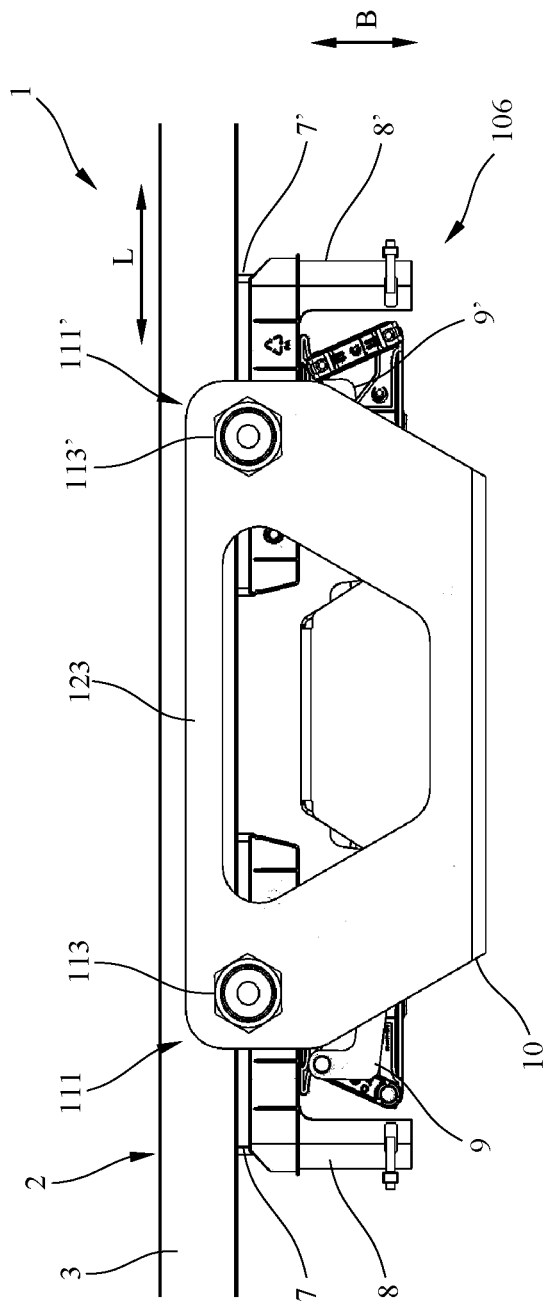
FIG. 10 a lateral plan view of the brushgear system shown in FIG. 8 with a largely worn-down sliding contact.
Figure 12:
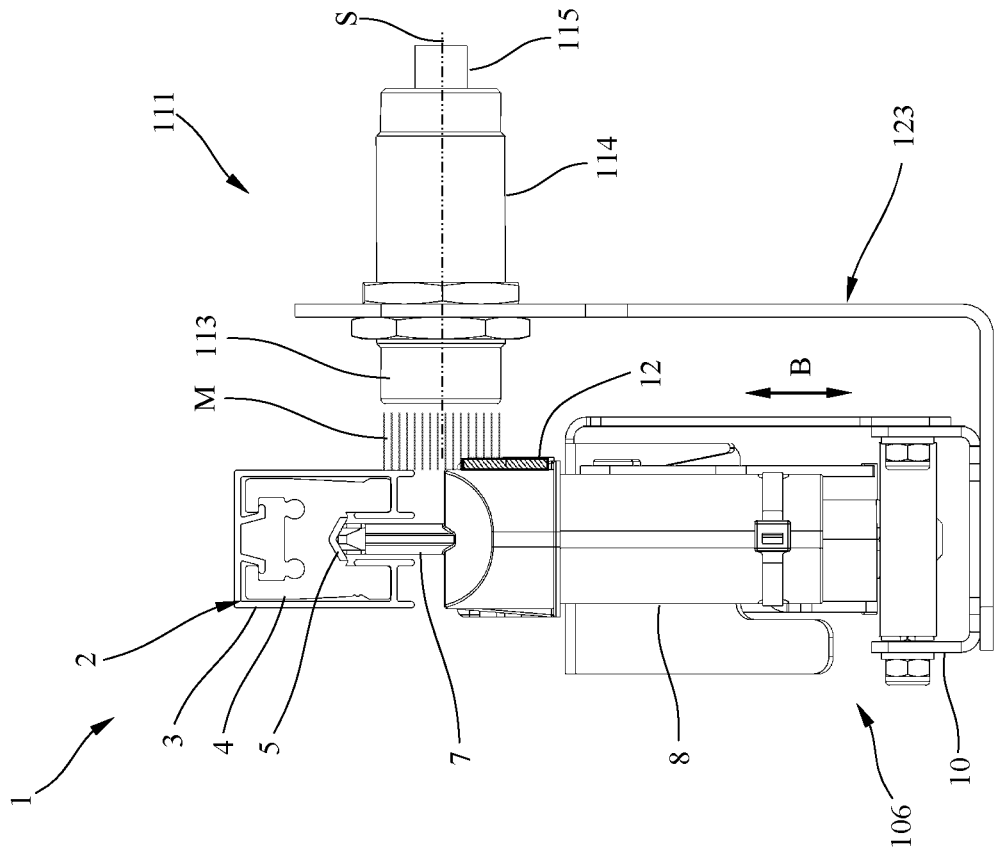
FIG. 12 a frontal plan view of the brushgear system shown in FIG. 8 with a largely worn-down sliding contact.

To detect the measurement indicator 12 by means of the sensor 13, the measurement indicator and the sensor are coordinated with respect to each other so that the measuring signal of the sensor 13 can be influenced by the measurement indicator 12, and especially by the distance of the measurement indicator from the brushgear 2. In the current practical example, the measurement indicator 12 is disposed in such a position on the sliding contact support 8 that it can be detected by the sensor 13 only once the predetermined level of wear on the sliding contact 7 is reached and the measurement indicator 12 enters the indicated measuring range M of the sensor 13. In FIGS. 3 and 4, the measuring range M is lengthened in the form of a stripe extending from the sensor 13 toward the measurement indicator 12, while it actually projects in the form of a circle only in the area of the sensor 13 in the direction of the brushgear 2, as indicated in FIGS. 5 and 6. The stripe-shaped longitudinal extension of the measuring range M shown in FIGS. 3 and 4 only serves to illustrate that the measurement indicator 12 in FIG. 3 proceeds outside of and, more particularly, below the measuring range M, while the measurement indicator 12 in FIG. 3 has already entered the measuring range and can therefore be detected by the sensor 13. Similarly, the measuring range in FIGS. 5 and 6 also does not abruptly end on the left side as shown in the drawings but projects slightly farther in the horizontal direction beyond the left end shown in the drawings.

The measurement indicator 12 and the sensor 13 can optionally also be positioned in such a way that the measurement indicator 12 can be detected earlier, i.e., when the sliding contact supports 8 are occupying a lower position, as shown in the drawings; however, in this case, a warning signal is issued only when the sensor signal signals that a predetermined threshold value for the predetermined level of wear is being exceeded. For example, the threshold value can be set in such a way that the detected sensor signal must have a specific signal strength in order to reliably detect the level of wear of the sliding contact 7.

In the case at hand, the measurement indicator 12 is an RFID transponder known in the art that is preferably passive, i.e., it has no power source of its own. Correspondingly, the sensor 13 is designed as an RFID reading module so as to be able to detect the RFID transponder 12. Because of the limited range of the sensor 13, when the RFID transponder 12 is in a position a distance away from the sensor as shown in FIG. 5, the sensor 13 is not yet able to detect the RFID transponder; instead, detection by the sensor is possible only after the measurement indicator 12 has laterally entered the transmitting/receiving range of the sensor 13, i.e., from below as shown in FIGS. 4 and 6.

Furthermore, the sensor axis S of the sensor 13 need not necessarily extend in a horizontal direction as shown in FIGS. 1 to 6, but it could also extend in a vertical direction, i.e., in the direction of movement B. In this case, the measurement indicator 12 could preferably be disposed, rotated by an angle of 90°, along the side of the sliding contact support 8, which would rotate the entire measuring setup by 90°. Thus, as the level of wear of the sliding contact 7 increases, the distance between the sensor 13 and the measurement indicator 12 would decrease in the direction of movement B of the feed mechanism 9. When the measurement indicator 12 subsequently enters the measuring range M of the sensor 13, this would actuate the trigger for the warning signal to the control unit.

In this embodiment, assuming a sufficiently wide measuring range and sensitivity setting for the sensor 13, it is possible to dispose the sensor 13 above or on the brushgear 2 and to orient it downwardly so that it can detect the measurement indicator 12 passing underneath as soon as the sliding contact support 8 has moved sufficiently close to the sensor 13. The measurement indicator 12 can also be disposed on the current collector 6 so as to be oriented upwardly, i.e., rotated by 90°, and more specifically, it can then also be disposed on the sliding contact support 8 or on the feed mechanism 9.

Different alignments of the sensor 13 relative to the measurement indicator 12 are possible as well, e.g., a laterally oblique alignment.

Instead of the measuring principle described above in which an RFID transponder with an associated RFID reading module is used, it is also possible to employ other measuring methods that detect the approaching movement of the sliding contact support 8, and thus the measurement indicator 12, toward the brushgear 2. For example, it would be possible to use an inductive or capacitive proximity sensor. To better protect the measurement indicator 12 against external influences, it could optionally also be integrated into the sliding contact 7 or into one of the components of the current collector 6 that move with the sliding contact 7.

However, if the measurement indicator 12 comprises an RFID transponder or another writable data storage device that can be read by the sensor 13, data relating to the sliding contact 7 used can be additionally stored on the measurement indicator 12, which data can then be read and transmitted to the control unit once the measurement indicator is in sufficiently close proximity to the sensor 13; such data include, for example, information about the properties of the sliding contact 7, such as dimensions, material, etc. This would make it easy to order a replacement for the worn-down sliding contact 7 in good time and have it ready when needed. This offers a special advantage in that in certain brushgear systems, the sliding contacts used for power transmission are different from the sliding contacts used, for example, for grounding. Thus, even if current collectors with a plurality of sliding contacts are used, additional information as to exactly which type of sliding contact support on which current collector is involved could be stored on the measurement indicator 12 and, respectively, on the measurement indicators dedicated to the separate sliding contacts. This would further facilitate the replacement of a worn-down sliding contact.

FIGS. 7 to 12 show an alternative configuration of a brushgear system 101 according to the present invention that differs from that shown in FIGS. 1 to 6 mainly in that, instead of having one sensor 13 disposed on the brushgear 2, there are two sensors 113, 113' that are disposed directly on a suitably adapted current collector 106. To the extent possible, components having functions identical to those in the configuration shown in FIGS. 1 to 6 are identified by identical reference characters and names, followed, as required, by the leading numeral 100, i.e., for example, "106" for the alternative current collector instead of "6" for the current collector of FIGS. 1 to 6. In all other respects, the explanations given above for the first practical example in FIGS. 1 to 6 apply mutatis mutandis, especially the explanations relating to the working principles and the configuration of the sensors 113, 113' and the measurement indicators 12, 12'.

Figure 11:
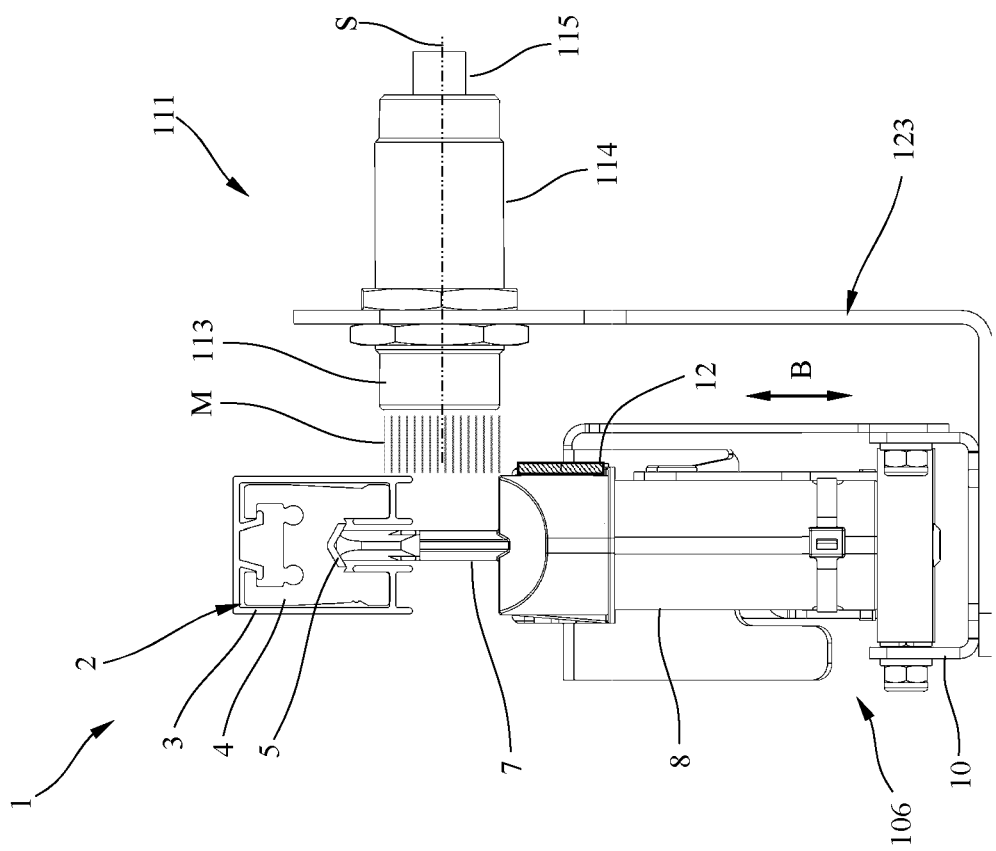
FIG. 11 a frontal plan view of the brushgear system shown in FIG. 7 with an unworn sliding contact.

To this end, the current collector 106 comprises a mounting device in the form of a trapezoid fixing plate 123 with a cutout, with the fixing plate widening in the upward direction and extending from the bracket 10 upwardly in the direction of movement B to the brushgear 2. Disposed on this fixing plate are the sensors 113, 113' in such a way that when the sliding contact 7 shown in FIG. 11 is barely worn down, the measurement indicator 12 is positioned outside the measuring range M of the sensors 113. When the sliding contact support 8, along with the increasingly worn-down sliding contact 7, subsequently continues to move in the direction of the brushgear 2, the measurement indicator 12 again moves into the measuring range M of the sensor 113, thereby making it possible to detect the worn-out sliding contact 7. This applies mutatis mutandis also to the other sensor 113' on the right side as shown in FIGS. 7 to 10 for the right sliding contact support 8'.

In all other respects, the explanations given above for the first practical example in FIGS. 1 to 6 apply mutatis mutandis. In particular, the sensor 113 in the practical example shown in FIGS. 7 to 12 can also be disposed in such a way that, when the sliding contact 7 is not worn down, the measurement indicator 12 is positioned within the measuring range M of the sensors 113. Only as the level of wear on the sliding contact 7 increases does the measurement indicator move upwardly and out of the measuring range M of the sensor 113.

The configuration shown in FIGS. 7 to 12 has the advantage over the configuration shown in FIGS. 1 to 6 that the position and thus the level of wear of the sliding contacts 7, 7' can be continuously monitored, and specifically not only in the positions of the brushgears 2 on which the sensor 13 is disposed. Especially if a plurality of brushgears 2 with a length of 100 m are involved, it is definitely possible for the electrical load to move for a relatively long time only over a relatively short stretch alongside the brushgear 2. If no sensor 13 is disposed within this stretch, the wear on the sliding contacts 7, 7' in this stretch cannot be detected. To avoid this possibility, a plurality of sensors 13 must be disposed along the length of the brushgear 2, preferably distributed at regular intervals, which entails higher costs and complex equipment, for example, for the cabling system. In contrast, the solution shown in FIGS. 7 to 12 requires only one sensor 113, 113' for each sliding contact 7, 7'.

Instead of or in addition to the contactless detection illustrated in FIGS. 7 to 12, the level of wear on the sliding contact 7, 7' in this configuration can also be detected by a different means; for example, it is possible to provide one or a plurality of switches that are disposed on the current collector 106 in such a way that they are triggered when the sliding contact 7 or a component of the current collector 106, which component, along with the sliding contact 7, moves toward the brushgear 2, approaches the switch. Furthermore, as an alternative or in addition thereto, it is possible to provide switches that are activated and issue a warning signal when the sliding contact 7 or a component of the current collector 106, which, along with the sliding contact 7, moves toward the brushgear 2, moves away from the switch.

Furthermore, in a favorable configuration (not shown in the drawings), the positions of the sensor 13 or the sensors 113, 113', respectively, and of the measurement indicators 12 or 12' can be interchanged, i.e., the sensor 13 or the sensors 113, 113', respectively, are mounted on a component of the current collector 6 or 106, which component, along with the worn-down sliding contact 7, approaches the brushgear 2, and the measurement indicators 12 or 12' are instead disposed on the brushgear 2. As soon as the sensor 13 or the sensors 113, 113' have moved close enough to the brushgear 2 so that the measurement indicator 12 or 12' disposed thereon enters the measuring range M of the sensor 13 or the sensors 113, 113', a signal would be issued.

However, the disadvantage of this configuration is that a separate sensor would have to be dedicated to each sliding contact 7, 7', whereas especially in the practical example shown in FIGS. 1 to 6, only one sensor 13 must be provided for the entire brushgear system 1, and only the markedly smaller, more robust and less expensive measurement indicators 12, 12' are required for the sliding contacts 7, 7'.

The invention claimed is:

1. A device for detection of wear of a sliding contact which is moveable in a longitudinal direction along a brushgear, the device comprising a sensor and a measurement indicator detectable by the sensor when the measurement indicator is located in a detectable range of the sensor, with the sensor and the measurement indicator moving close to or away from each other in a movement direction due to wear-induced shortened length of the sliding contact, wherein the movement direction is substantially perpendicular to the longitudinal direction, wherein the sensor is designed for contactless detection of the measurement indicator, wherein the sensor comprises an RFID writing and/or reading module, and the measurement indicator comprises an RFID transponder with a contactlessly readable and/or writable data storage device.

2. The device of claim 1, wherein the device comprises a mounting device for mounting the sensor on the brushgear.

3. The device of claim 2, wherein the mounting device comprises a mounting element that is positionable on top of the brushgear.

4. The device of claim 3, wherein the mounting element has an inside contour conforming to the outside contour of the brushgear.

5. The device of claim 3, wherein the mounting element has an substantially U-shaped cross-section with two mounting legs that, in the mounted position, straddle the brushgear.

6. The device of claim 5, wherein free ends of the mounting legs have a first detent means for connection to a complementarily shaped second detent means of the brushgear.

7. The device of claim 1, wherein the sensor is disposed on a current collector that supports the sliding contact.

8. The device of claim 7, wherein a separate sensor is each dedicated to a plurality of sliding contacts that differ from each other and that are disposed on the current collector.

9. A brushgear system comprising a brushgear and at least one current collector moving alongside the brushgear in a longitudinal direction thereof and having at least one sliding contact for contacting at least one electrically conductive conductor profile of the brushgear to supply an electrical load moving alongside the brushgear, with the brushgear system comprising the device of claim 1 for detection of wear on the at least one sliding contact.

10. The brushgear system of claim 9, wherein the sensor is disposed on the brushgear.

11. The brushgear system of claim 9, wherein the sensor is disposed on the current collector.

12. The brushgear system of claim 10, wherein the measurement indicator is disposed on a component of the current collector, which component, together with the sliding contact, moves in the direction of the brushgear.

13. The brushgear system of claim 12, wherein, during operation, the sliding contact is permanently held so as to be oriented in the direction of the brushgear by a feed mechanism.

14. The brushgear system of claim 9, wherein the measurement indicator and the sensor are disposed relative to each other in such a way that the measurement indicator, as a result of wear-induced shortened length of the sliding contact in the direction of the brushgear, enters a measuring range of the sensor only after a predetermined level of wear on the sliding contact has been exceeded.

15. A method for detection of wear of a sliding contact of a brushgear, the method comprising:
provides a sensor and a measurement indicator that moves with the sliding contact in a longitudinal direction along the brushgear and that is detectable by the sensor when the measurement indicator is located in a detectable range of the sensor;
using the sensor to contactlessly detect movement of the measurement indicator toward the sensor; and
issuing a warning signal when a threshold value for a predetermined level of wear on the sliding contact is exceeded,
wherein the movement of the measurement indicator toward the sensor is in a direction substantially perpendicular to the longitudinal direction and wherein the sensor comprises an RFID writing and/or reading module, and the measurement indicator comprises an RFID transponder with a contactlessly readable and/or writable data storage device.

16. The method of claim 15, wherein the threshold value for the predetermined level of wear has been exceeded when the measurement indicator completely or partially enters a measuring range of the sensor or completely or partially moves out of the measuring range.

17. The method of claim 15, wherein the measurement indicator, together with the sliding contact, move in the direction of the brushgear.

18. The device of claim 1, wherein the measurement indicator is located in the detectable range of the sensor when a predetermined level of wear on the sliding contact has been exceeded.

19. The device of claim 1, wherein data stored in the data storage device of the measurement indicator includes sliding contact data, the sliding contact data including at least one of dimensions of the sliding contact and material of the sliding contact, and wherein the RFID transponder transmits the sliding contact data.

20. The device of claim 1, wherein the detection of wear of the sliding contact is independent of any change in impedance of the sliding contact.

* * * * *